US011257069B2

(12) United States Patent
Zagone

(10) Patent No.: US 11,257,069 B2
(45) Date of Patent: Feb. 22, 2022

(54) SYSTEMS AND METHODS FOR AN ALL-IN-ONE MOBILE WALLET WITH ADMINISTRATOR PORTAL

(71) Applicant: Wells Fargo Bank, N.A., San Francisco, CA (US)

(72) Inventor: Katherine Zagone, Portland, OR (US)

(73) Assignee: Wells Fargo Bank, N.A., San Francisco, CA (US)

(*) Notice: Subject to any disclaimer, the term of this patent is extended or adjusted under 35 U.S.C. 154(b) by 1 day.

(21) Appl. No.: 16/212,524

(22) Filed: Dec. 6, 2018

(65) Prior Publication Data

US 2020/0184464 A1  Jun. 11, 2020

(51) Int. Cl.
*G06Q 20/32* (2012.01)
*G06Q 20/36* (2012.01)

(52) U.S. Cl.
CPC .......... *G06Q 20/363* (2013.01); *G06Q 20/32* (2013.01)

(58) Field of Classification Search
CPC .................................................. G06Q 20/363
See application file for complete search history.

(56) References Cited

U.S. PATENT DOCUMENTS

| | | | | |
|---|---|---|---|---|
| 9,783,162 | B2* | 10/2017 | Hoyos | H05K 999/99 |
| 2002/0023122 | A1* | 2/2002 | Polizzi | G06F 16/972 |
| | | | | 709/202 |
| 2005/0158697 | A1* | 7/2005 | Nelson | G09B 7/00 |
| | | | | 434/350 |
| 2012/0310824 | A1* | 12/2012 | Liberty | G06Q 40/02 |
| | | | | 705/40 |
| 2014/0372605 | A1* | 12/2014 | Naseh | H04L 41/5058 |
| | | | | 709/224 |
| 2015/0120472 | A1* | 4/2015 | Aabye | G06Q 20/322 |
| | | | | 705/16 |
| 2015/0278780 | A1* | 10/2015 | Vaidyanathan | G06Q 20/405 |
| | | | | 705/42 |
| 2018/0077151 | A1* | 3/2018 | Campero | G07C 9/28 |
| 2019/0114694 | A1* | 4/2019 | Horimoto | G06F 16/958 |

OTHER PUBLICATIONS

Jun, Cho, and Park, in "Factors influencing continued use of mobile easy payment service: an empirical investigation," from Total Quality Management (2018).*

* cited by examiner

*Primary Examiner* — Olabode Akintola
*Assistant Examiner* — Brandon M Duck
(74) *Attorney, Agent, or Firm* — Foley & Lardner LLP

(57) ABSTRACT

A system includes an administration tool circuit structured to store a list of enrolled services for a mobile wallet application, store a user account corresponding to an end user of the mobile wallet application, provide a portal structured to allow an administrator to input a command to assign a subset of the enrolled services to the user account, and generate a customized mobile wallet for the user based on the user account. The customized mobile wallet provides access to the subset of the available services. The system also includes a mobile wallet circuit communicably and operably coupled to the administration tool circuit and structured to receive the customized mobile wallet from the administration tool circuit, receive a request from the user device to access a first service of the customized mobile wallet, and provide the first service at the user device via the customized mobile wallet.

15 Claims, 9 Drawing Sheets

SYSTEMS AND METHODS FOR AN ALL-IN-ONE MOBILE WALLET WITH ADMINISTRATOR PORTAL

TECHNICAL FIELD

The present disclosure relates generally to mobile wallet technology.

BACKGROUND

A mobile device may include one or more "mobile wallets." A mobile wallet enables electronic transactions via the mobile device (e.g., smartphones). For example, the electronic transaction can include allowing a user to pay for a good or service at a point-of-sale terminal using a payment card provisioned to the mobile wallet. Mobile wallets are primarily focused on payment card transactions with a limited number of other commerce-related uses (e.g., event ticketing, mobile boarding passes). Additionally, mobile wallet applications are generally made available such that all users have access to the same services. This one-size fits all approach to mobile wallets is typically ill-suited for many users and, in turn, many applications. Therefore, improved mobile wallets are desired for better appeal to users and provider entities.

SUMMARY

One implementation of the present disclosure is a system. The system includes an administration tool circuit structured to store a list of enrolled services for a mobile wallet application, store a user account corresponding to an end user of the mobile wallet application, provide a portal structured to allow an administrator to input a command to assign a subset of the enrolled services to the user account, and generate a customized mobile wallet for the user based on the user account. The customized mobile wallet provides access to the subset of the available services. The system also includes a mobile wallet circuit communicably and operably coupled to the administration tool circuit and structured to receive the customized mobile wallet from the administration tool circuit, receive a request from the user device to access a first service of the customized mobile wallet, and provide the first service at the user device via the customized mobile wallet.

Another implementation of the present disclosure is a method. The method includes storing a list of available services for a mobile wallet application, storing a user account corresponding to a user of the mobile wallet application, providing a portal structured to allow an administrator to input a command to assign a subset of the available services to the user account, and generating a customized mobile wallet for the user based on the user account. The customized mobile wallet provides access to the subset of the available services. The method also includes receiving a request from a user device to access a first service of the customized mobile wallet and providing the first service at the user device via the customized mobile wallet.

Another implementation of the present disclosure is one or more non-transitory computer-readable media containing program instructions that, when executed by one or more processors, cause the one or more processors to perform operations. The operations include storing a list of available services for a mobile wallet application, storing a user account corresponding to a user of the mobile wallet application, providing a portal structured to allow an administrator to input a command to assign a subset of the available services to the user account, and generating a customized mobile wallet for the user based on the user account. The customized mobile wallet provides access to the subset of the available services. The operations also include receiving a request from a user device to access a first service of the subset of the available services and providing the first service at the user device via the customized mobile wallet.

BRIEF DESCRIPTION OF THE FIGURES

Various objects, aspects, services, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION OF THE FIGURES

Referring generally to the FIGURES, systems and methods for an administrated mobile wallet system are shown, according to example embodiments. The administrated mobile wallet system provides various technical advantages over existing mobile wallet systems. First, the administrated mobile wallet system provides multiple services, diverse functionality, and interactions with various third-party systems via a single mobile wallet application and user interface, which eliminates the need for additional systems, programming, applications, etc. Second, the administrated mobile wallet system provides an administrator portal that facilitates a selection of the services that will be made available to a particular user of the administrated mobile wallet system, such that different users may be authorized to access different services via the administrated mobile wallet system. Accordingly, the administrated mobile wallet system provides a unified, flexible, customizable multi-function mobile wallet that may provide each user only with the services appropriate for that user. The administrated mobile wallet system thereby matches the needs of each individual administrator entity (i.e., each mobile wallet provider), which eliminates or mostly eliminates inefficiencies caused by unused services while also providing additional services where needed. These and other improvements over existing technologies provided by the systems and methods disclosed herein are described in detail below.

Figure 1:
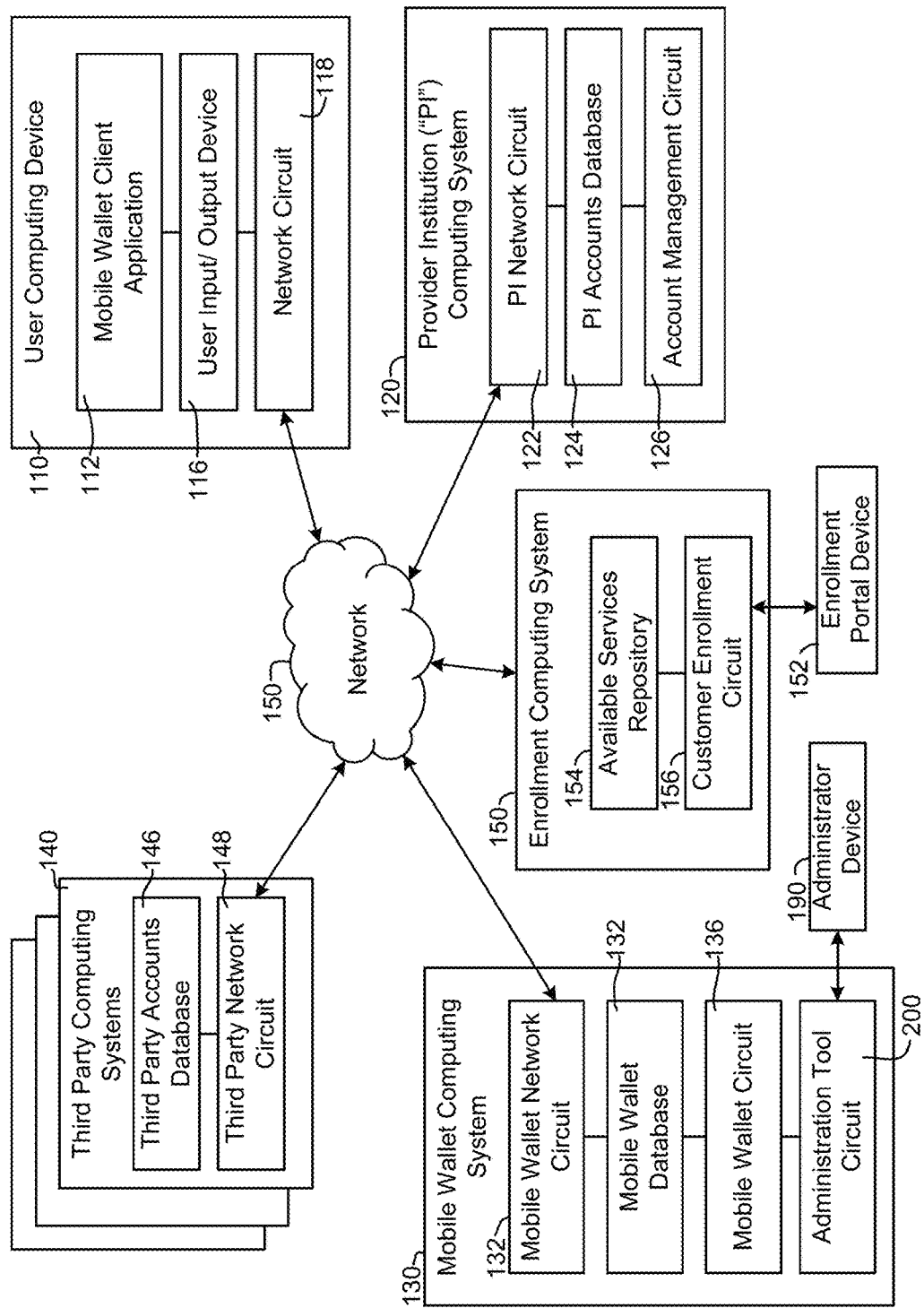
FIG. 1 is a block diagram of a system for providing customized mobile wallets, according to an example embodiment.

Referring now to FIG. 1, a block diagram of a computer-implemented system 100 for providing a multi-functional client application is shown, according to an example embodiment. As shown, the system 100 includes a user device 110 associated with a user, a provider institution computing system 120 associated with a provider institution, a mobile wallet computing system 130 associated with a mobile wallet provider, an enrollment computing system 150 associated with a wallet framework provider, and one or more third party computing systems 140 associated with various third parties. The various systems and devices may be communicatively and operatively coupled through a network 150, which may include one or more of the Internet, cellular network, Wi-Fi, Wi-Max, a proprietary banking network, or any other type of wired or wireless network or a combination of wired and wireless networks. As described herein, the system 100 may be used to provide a multi-functional client application on the user device 110.

The mobile wallet computing system 130 is structured to permit, enable, facilitate, manage, process, and otherwise allow mobile wallet transactions in addition to other commercial and non-commercial services made available via a mobile wallet. As used herein, the term "mobile wallet transaction" refers to a transaction performed between the user computing device via the mobile wallet client application and another device (e.g., a point-of-sale ("POS") device, an access control device) to facilitate one or more mobile wallet services. The mobile wallet computing system 130 may be associated with, owned by, and/or otherwise operated by a mobile wallet provider. In one embodiment, the mobile wallet provider may be a provider institution, such as the provider institution associated with the provider institution computing system 120. In this instance, the mobile wallet computing system 130 may be a part of the provider institution computing system 120. In another embodiment and as shown, the mobile wallet provider may be a third party provider relative to the provider institution that operates the provider institution computing system 120. For example, in some embodiments the mobile wallet provider may be a university, business park, corporation, governmental entity, etc. that administers a mobile wallet service for various end users (e.g., students, faculty, employees, etc.) that occupy a campus managed by the mobile wallet provider.

In any configuration, the mobile wallet computing system 130 may provide or at least partly provide a mobile wallet circuit 136. As described in more detail herein, the "mobile wallet" is a digital wallet provided on, for example, the user device 110. The digital wallet may include payment capabilities, such as the ability to use a communication protocol (e.g., near-field communication) at a point-of-sale terminal to transfer payment information and enable the purchase of a good or service. Additionally, the digital wallet may include many other capabilities and services that are described herein in more detail, including commercial and non-commercial services.

In arrangements where the mobile wallet provider is the provider institution associated with the provider institution computing system 120, each of the operations described herein with respect to the mobile wallet computing system 130 may also be described as being performed by the same provider institution. In such arrangements, the provider institution computing system 120 and the mobile wallet computing system 130 may be operated as a single computing system, or as two or more separate computing systems (as shown in FIG. 1) performing the associated functions described herein. As will be appreciated, the level of functionality that resides on the provider institution computing system 120 as opposed to the mobile wallet computing system 130 in these arrangements may vary depending on the implementation.

With the above in mind, the mobile wallet computing system 130 is shown to include a mobile wallet database 134, a mobile wallet circuit 136, and a mobile wallet network circuit 138 enabling the mobile wallet computing system 130 to exchange data over the network 150. The mobile wallet computing system 130 may be configured to exchange data or information with the user device 110, provider institution computing system 120, and third party computing systems 140 in the implementation of a user mobile wallet.

Mobile wallet database 134 is structured to store information regarding mobile wallet accounts held by various users, such as for a mobile wallet account held by the user of the user device 110. For instance, the mobile wallet database 134 may store various forms of information related to the user and/or an associated mobile device upon registration of one or both for a mobile wallet. The stored mobile wallet account information may include authentication information (e.g., username/password combinations, device authentication tokens, security question answers, etc.), payment card information, transaction histories, account holder identifying information, registered device information, and any other information that may be encountered in the operation of a mobile wallet account or otherwise referenced herein. Such information may include user preferences and other information comprising a user profile. In some arrangements, for example, mobile wallet database 134 also includes a token vault that is maintained by the mobile wallet computing system 130. The token vault may include a lookup table maintaining tokens associated with various user payment vehicles. The tokens stored therein may be generated internally (e.g., at the mobile wallet computing system 130) or by other entities (e.g., a token service provider computing system). For example, in one embodiment, the token vault may include a lookup table including tokens that that have been randomly assigned to a user payment vehicle (e.g., user checking accounts, credit/debit cards, and the like) by the mobile wallet computing system 120. In some arrangements, the mobile wallet computing system 130 may include an associated token management system (not shown) including one or more algorithms, processes, formulas, etc. that facilitate the efficient searching of the information stored in the token vault. For example, a mapping algorithm may be utilized to map Token-to-PAN information. Thus, when a token is received, the mapping algorithm determines the associated PAN and sends that information to the issuer.

The mobile wallet circuit 136 is structured to provide a mobile wallet on the user device 110. In particular, the mobile wallet circuit 136 is structured to provide a mobile wallet client application 112 on the user device 110. In this regard, the mobile wallet circuit 136 enables registrations of a user for a mobile wallet, presents the user with various user interfaces enabling user to use or manage a mobile wallet, and enables users to perform transactions using the mobile wallet (e.g., as described with respect to the mobile wallet client application 112 herein).

Third party computing systems 140 are computing systems associated with various third parties. As used herein with respect to third party computing systems 140, "third parties" refer to entities that provide various electronic (e.g., web or application-based) services. While conventionally these third parties provide their services independent of the provider institution or mobile wallet provider, according to the present disclosure, the system 100 includes various services to facilitate the integration of the services provided via the third party computing systems 140 and those provided by the mobile wallet provider and/or provider institution. The "services" may include, but are not limited to payment-related services (such as online shopping, search engines, product review services, issuer-specific financial rewards, social media accounts, security services, and the like), access control services (e.g., door lock systems, elevator access systems), membership or registration services (such as for fitness centers, academic courses, etc.), and various other commercial and non-commercial services that may be accessed via a mobile wallet provided by the mobile wallet computing system 130. As one of many possible examples, a third party may include a building security vendor who provides security and access control services for a campus associated with the mobile wallet provider (e.g., a university campus where the mobile wallet provider is the university).

Third party computing systems 140 include a third party accounts database 146 and a third party network circuit 148 that enables the third party computing system 140 to exchange data, information, values, and the like over the network 150. The third party accounts database 146 is structured to retrievably store user information relating to user relationships with the third party, and may include non-transient data storage mediums (e.g., local disc or flash-based hard drives, local network servers, and the like) or remote data storage facilities (e.g., cloud servers). Third party account database 146 may include information pertaining to user accounts with the third party. The information stored in the third party account database 146 varies depending on the particular service provided by the third party computing system 140 via the mobile wallet. In some embodiments, the third party accounts database 146 may be accessed by the mobile wallet computing system 130 and/or the mobile wallet client application 112 to retrieve and/or modify information stored therein.

In various embodiments, the third party computing system 140 includes various software components such as various software development kits ("SDKs") that facilitate, enable, or otherwise permit the third party to integrate various functionalities provided by the mobile wallet provider into services provided via the third party computing system 140 and vice versa. For example, in various embodiments, the mobile wallet provider associated with the mobile wallet computing system 130 provides access to an SDK to facilitate the development of applets providing users with access to third party services accessible to the user via the mobile wallet computing system 130. Via the applets, such services of the third party computing systems 140 may be exposed to a user via the mobile wallet (i.e., via the mobile wallet computing system 130 and/or the mobile wallet client application 112). Each applet may be associated with a particular type of service and be associated with an API at the mobile wallet computing system 130 configured to facilitate the interaction between the mobile wallet computing system 130 and the third party computing systems 140 to provide third party services via the mobile wallet.

The provider institution computing system 120 is a computing system at a provider institution that provides and maintains one or more financial accounts (e.g., demand deposit account, credit or debit card account, brokerage account, mortgage account, etc.) on behalf of the user. In some arrangements, the provider institution is an issuer of a payment vehicle held by the user. The payment vehicle may be associated with transactions engaged in via the user's mobile wallet. In the context of the present disclosure, the provider institution can include commercial or private banks, credit unions, investment brokerages, mobile wallet providers, other financial institutions, and so on. The provider institution can also include any commercial entity capable of maintaining payment vehicles on behalf of a user, including retailers, vendors, service providers, and the like. For example, in one embodiment, the provider institution can be a merchant implementing a loyalty card program having a loyalty card. The loyalty card may be provisioned to the user's mobile wallet such that the user may conduct mobile wallet transactions with the loyalty card. In some arrangements, the provider institution is also a mobile wallet provider configured to manage mobile wallet accounts on behalf of its customers (i.e., users), including authenticating mobile wallet transactions involving debits from the users' payment vehicles. For example, the provider institution may also own, be associated with, or otherwise operate the mobile wallet computing system 130 in various embodiments.

The provider institution computing system 120 includes a provider institution network circuit 122 enabling the provider institution computing system 120 to exchange data over the network 150, a provider institution accounts database 124, and an account management circuit 126. The provider institution accounts database 124 is structured to retrievably store user information relating to the various operations discussed herein, and may include non-transient data storage mediums (e.g., local disc or flash-based hard drives, local network servers, and the like) or remote data storage facilities (e.g., cloud servers). The accounts database 124 may include personal information (e.g., names, addresses, phone numbers, and so on), authentication information (e.g., username/password combinations, device authentication tokens, security question answers, unique customer identifiers, biometric data, etc.), and financial information (e.g., token information, account numbers, account balances, available credit, credit history, transaction histories, and so on) relating to the various users and associated financial accounts. The account management circuit 126 is structured to manage the financial accounts of various users, including maintaining and handling transaction processing for the user's one or more financial accounts. For example, in some embodiments, the account management circuit 126 is configured to receive various account management preferences from, for example, the user device 110. Some of such user preferences may include designations of pre-authentication user information (PUI). Via the mobile wallet client application 112, the user may specify various forms of information that the user wishes to be accessible (e.g., for viewing on a graphical user interface, for use in facilitating a mobile wallet service) prior to authentication via the mobile wallet client application 112. Such information may include various identities of user accounts (e.g., actual account numbers, surrogate account numbers, account names), balances associated with the user accounts, transaction histories associated with the user accounts, and other information held by the provider institution.

The user device 110 is a computing device associated with the user. The user may include one or more individuals, business entities, government entities, and agents. The user device 110 is structured to exchange data over the network 150, execute software applications, access websites, generate graphical user interfaces, and perform other operations described herein. The user device 110 may include any sort of computing device, such as a smartphone, personal computer, a wearable computing device (e.g., eyewear, a watch or bracelet, etc.), a tablet, a portable gaming device, a laptop, and any other form of computing device (e.g., a smart appliance, a smart speaker, etc.). In the example shown, the user device 110 is a smartphone.

The user device 110 includes a mobile wallet client application 112, a user input/output ("I/O") device 116, and a network circuit 118 enabling the user device 110 to exchange information over the network 150. The user I/O device 116 includes hardware and associated logics configured to enable the user device 110 to exchange information with a user and other devices (e.g., a merchant transaction terminal). An input aspect of the user I/O device 116 allows the user to provide information to the user device 110, and may include, for example, a mechanical keyboard, a touchscreen, a microphone, a camera, a fingerprint scanner, any user input device engageable to the user device 110 via a USB, serial cable, Ethernet cable, and so on. An output aspect of the user I/O device 116 allows the user to receive information from the user device 110, and may include, for example, a digital display, a speaker, illuminating icons, LEDs, and so on. The user I/O device 116 may include systems, components, devices, and apparatuses that serve both input and output functions, allowing the provider institution computing system 120 exchange information with the user device 110. Such systems, components, devices and apparatuses include, for example, radio frequency transceivers (e.g., RF or NFC-based transceivers) and other short range wireless transceivers (e.g., Bluetooth®, laser-based data transmitters, etc.).

The user device 110 further includes a mobile wallet client application 112. The mobile wallet client application 112 is structured to facilitate and permit various services, activities, and functionalities as described herein. The client application 112 is communicably coupled via the network circuit 118 over the network 150 to the mobile wallet computing system 130. In some embodiments, the client application 112 includes a circuit embodied within the user device 110. For example, the client application 112 may include program logic stored in a system memory of the user device 110. In such arrangements, the program logic may configure a processor of the user mobile device to perform at least some of the functions described herein with respect to the client application 112. In some other embodiments, the client application 112 is a web-based application (e.g., provided via the provider institution computing system 120). As will be understood, the level of functionality that resides on the user device 110 versus the mobile wallet computing system 130 will vary depending on the implementation.

The mobile wallet client application 112 includes or is otherwise associated with a customized mobile wallet implemented on the user device 110. The client application 112 is structured to permit mobile wallet users to engage in transactions or other interactions through the initiation of communications with, for example, a merchant POS device, access control device (e.g., a lock-control device located proximate a door), or other point of service device. For example, in some embodiments, the client application 112 includes a payment application facilitating exchange of mobile wallet credentials (e.g., tokenized account information) with the POS device. In this regard, the client application 112 may interface with a near-field-communications ("NFC") chip controller to exchange the mobile wallet credentials.

It should be understood that the role that the client application 112 takes in mobile wallet transactions will depend on the implementation of the mobile wallet. In some arrangements, for example, the mobile wallet is implemented in a secure element framework. In such arrangements, the user device 110 includes a secure element that is separate from the main system memory of the user device 110. The secure element refers to a tamper-resistant platform that hosts various applications and confidential information associated therewith. The secure element may include, but is not limited to, a universal subscriber identity circuit (a SIM card), a trusted execution environment, and/or a secure digital card. In such arrangements, user authentication information (e.g., payment account information, user PINS, and the like) is stored in the secure element. In various arrangements, the secure element of the user device 110 may include a payment application that interfaces with the NFC chip of the user device responsive to receiving a communication (e.g., an application protocol data unit) from the POS device to enable user payment information be transferred. In such arrangements, no user information is transferred by the client application 112 to the NFC chip. After user payment information is transmitted to the POS device, the client application 112 may query the secure element for transaction data to notify the user of the completed transaction.

In other arrangements, the client application 112 may operate under a host card emulation framework. In such arrangements, user payment information is maintained within the client application 112 or cloud-based environment (e.g., a host emulation service) rather than in the secure element. In this regard, the client application 112 may include a service component (e.g., a payment application) configured to interface with the NFC chip of the user device 110 to communicate user payment tokens to the merchant point of sale device. To ensure security of user information, the client application 112 may include sandboxing functionalities where a unique user ID (UID) is assigned to the client application 112, and where only other applications (e.g., third party client applications) including the same UID may share information stored in relation to the client application 112. In the embodiment shown, the client application 112 operates under the HCE framework.

In various other arrangements, the user-specific payment information may be stored in a trusted execution environment ("TEE") within a processor the user device 110. The systems and methods disclosed herein may also be used with other modalities currently available for storage and transfer of user payment device via contactless communication mechanisms. In the example shown, the client application 112 operates under an HCE framework. As such, to conduct a mobile wallet transaction utilizing the client application 112, the user device 110 may communicate with the mobile wallet computing system 130 (or other system) to retrieve a token for use in the conductance of a mobile wallet transaction.

The enrollment computing system 150 is structured to facilitate enrollment of the mobile wallet provider in mobile wallet services and provide a package of enrolled services to the mobile wallet computing system 130. The enrollment computing system 150 is affiliated with a wallet framework provider that provides some or all of the necessary software, SDKs, APIs, database objects, etc. for operation of the mobile wallet computing system 130. For example, in one example scenario the enrollment computing system 150 is operated by a software company dedicated to setting up mobile wallet services for entities such as universities that desire to provide mobile wallet services to their students and faculty. That is, the wallet framework provider may facilitate the creation of dedicated mobile wallet computing systems 130 for each of multiple customers of the wallet framework provider. For example, two universities may each have a separate mobile wallet computing system 130 facilitated by the wallet framework provided and provisioned using the enrollment computing system 150. In some cases, the enrollment computing system 150 may be included in the provider institutions computing system 120 and associated with the provider institution and/or included in a mobile wallet computing system 130. That is, in various embodiments, the structure, functionality, programming, etc. attributed herein to the enrollment computing system 150 may be included in the provider institutions computing system 120 and/or the mobile wallet computing system 130.

As shown in FIG. 1, the enrollment computing system 150 includes an available services repository 154 and a customer enrollment circuit 156. The enrollment computing system 150 is communicably and operably coupled to the network 150 and an enrollment portal device 152. The enrollment portal device 152 includes a computing device (e.g., desktop computer, laptop computer, tablet, mobile device) structured to display a graphical user interface to a user, for example an employee of the wallet framework provider, and to receive input from the user relating to the graphical user interface.

The available services repository 154 is structured to store various programming, logic, code, database objects, SDKs, application programming interfaces, etc. structured to facilitate each of multiple available mobile wallet services ("the available services") when implemented by the mobile wallet computing system 130. The available services repository 154 may include one or more memory devices (e.g., RAM, ROM, NVRAM, Flash Memory, hard disk storage, etc.) that store such data and programming instructions. The available services include mobile wallet transactions as described above and services provided based on interactivity with third party communications systems 140, including non-commercial services such as building access control. Various mobile wallet services are described in detail below. The customer enrollment circuit 156 is structured to facilitate enrollment of a mobile wallet provider in mobile wallet services, generate an enrolled services package for the mobile wallet provider, and provide the enrolled services package to the mobile wallet computing system 130.

Figure 6:
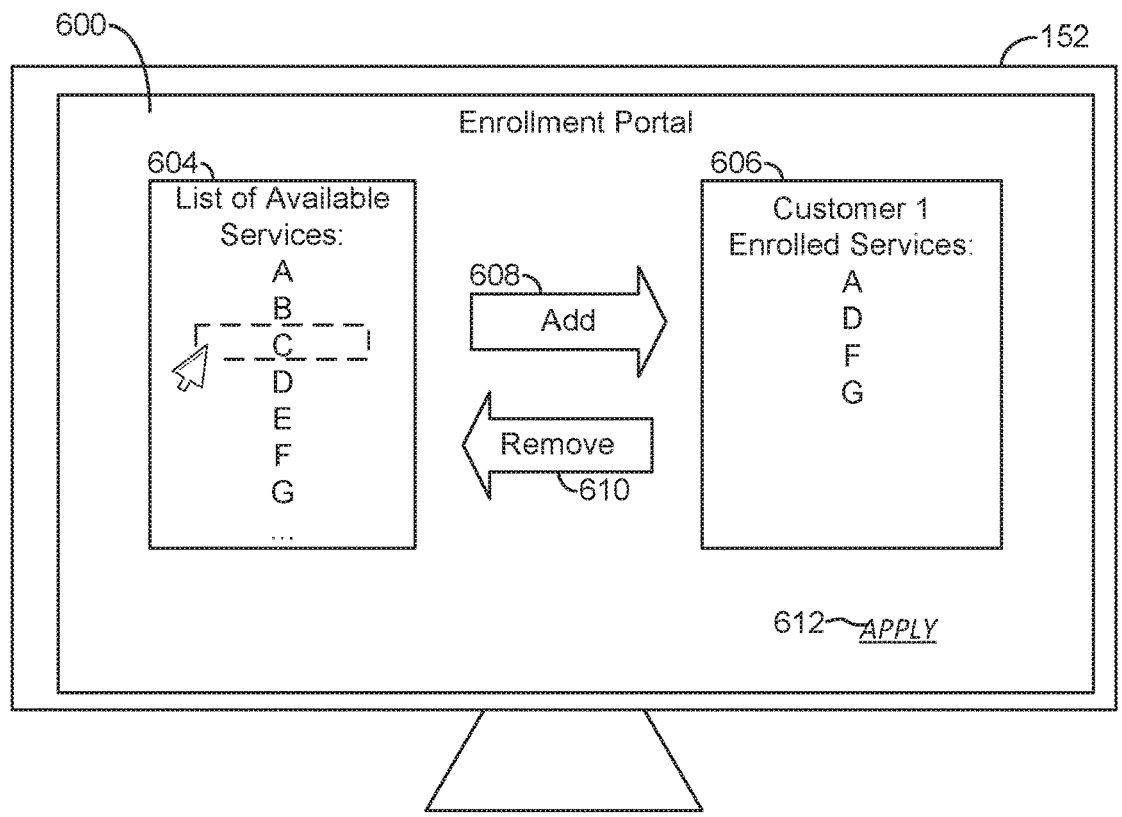
FIG. 6 is an illustration of an enrollment portal interface for use with the system of FIG. 1, according to an example embodiment.

In the example shown, the customer enrollment circuit 156 generates a graphical user interface that includes a list of the available services and provides the graphical user interface to the enrollment portal device 152. An example embodiment of such a graphical user interface is shown in FIG. 6 and described in detail with reference thereto. The customer enrollment circuit 156 receives user commands via the enrollment portal device 152 that indicate a subset of the available services that the mobile wallet provider shall be enrolled in, referred to hereafter as the enrolled services. For example, various subsets of available services may be selected based on the needs/desires of the mobile wallet provider, the budget of the mobile wallet provider, or various other considerations.

In response to receiving the user commands indicating the enrolled services, the customer enrollment circuit 156 automatically accesses the available services repository 154, copies the programming, logic, code, database objects, application programming interfaces, etc. corresponding to the enrolled services, and creates an enrollment package (e.g., a data file) that includes the programming, logic, code, database objects, application programming interfaces, etc. corresponding to the enrolled services. The customer enrollment circuit 156 thereby generates an enrollment package tailored to the needs of a particular mobile wallet provider. The enrollment computing system 150 then provides the enrollment package to the mobile wallet computing system 130.

The mobile wallet computing system 130 is structured to receive the enrollment package from the enrollment computing system 150 and implement the programming, logic, code, database objects, application programming interfaces, etc. in the enrollment package to provide the enrolled services to one or more end users via one or more user computing devices 110. The mobile wallet computing system 130 may interact with one or more third party systems 112 to provide the enrolled services. The mobile wallet computing system 130 is also structured to facilitate administration of end user accounts and generate a customized mobile wallet for each end user based on the corresponding end user account. The mobile wallet computing system 130 is shown in detail in FIG. 2 and described in detail with reference thereto.

Figure 2:
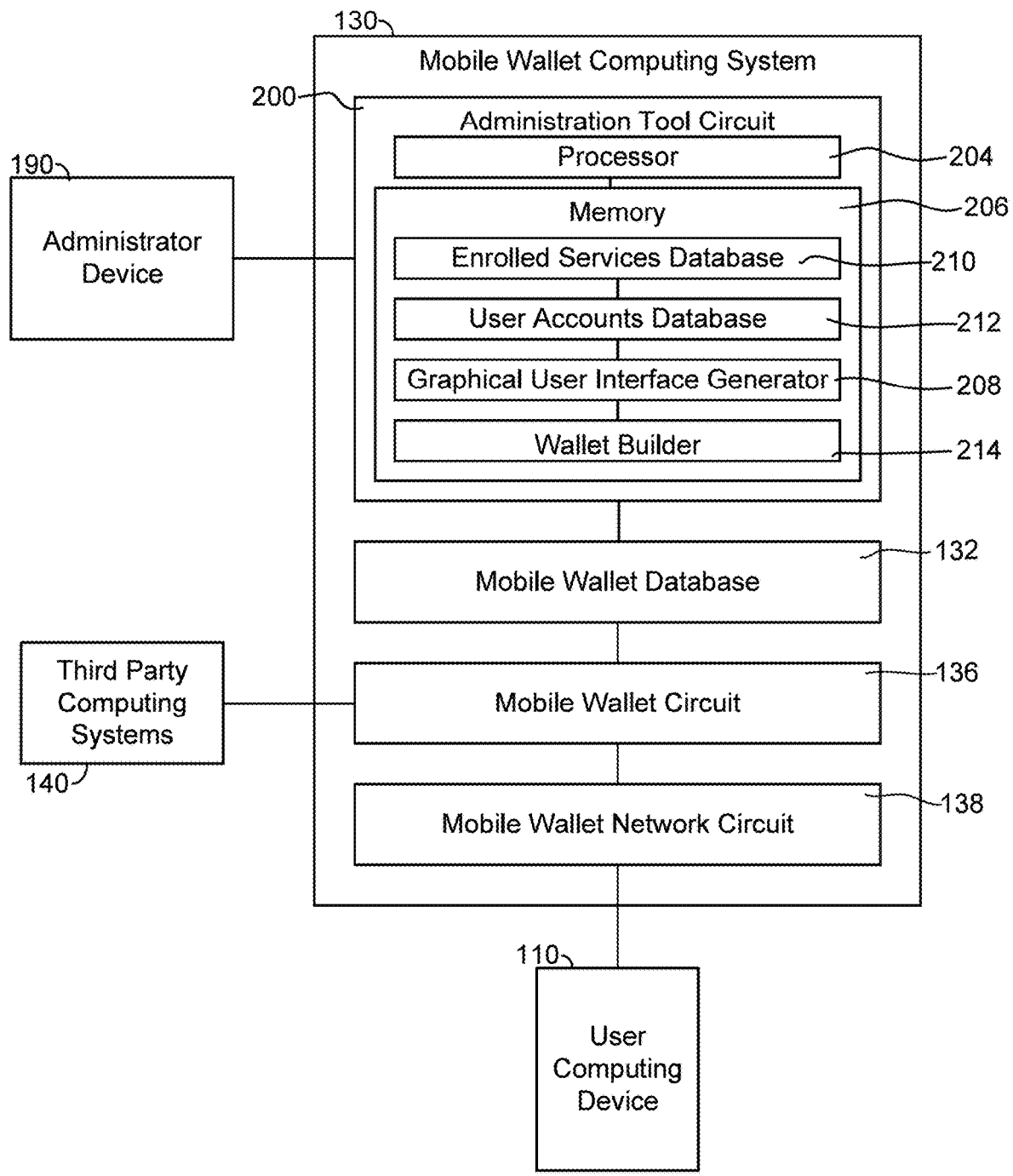
FIG. 2 is a block diagram of a mobile wallet computing system of FIG. 1, according to an example embodiment.

Referring now to FIG. 2, a detailed view of the mobile wallet computing system 130 is shown, according to an example embodiment. The mobile wallet computing system 130 is shown to include an administration tool circuit 200 communicably and operably coupled to the mobile wallet network circuit 138, the mobile wallet database 134, and the mobile wallet circuit 136.

The administration tool circuit 200 is structured to facilitate administration of the one or more end user mobile wallets provided by the mobile wallet computing system 130. The administration tool circuit 200 is shown to include a processor 204 and a memory 206. It should be understood that FIG. 2 shows one possible implementation of the administration tool circuit 200 from a detailed view. Various other implementations of the administration tool circuit 200 consistent with the definitions herein are possible in various embodiments.

The processor 204 may be implemented as a general-purpose processor, an application specific integrated circuit (ASIC), one or more field programmable gate arrays (FPGAs), a digital signal processor (DSP), a group of processing components, or other suitable electronic processing components. Memory 206 may be implemented as one or more memory devices (e.g., RAM, ROM, NVRAM, Flash Memory, hard disk storage, etc.) that store data and/or computer code for facilitating at least some of the various processes described herein. The memory 206 may store programming logic that, when executed by processor 204, controls the operation of the administration tool circuit 200. As shown in FIG. 2, the memory 206 includes a graphical user interface generator 208, an enrolled services database 210, a user accounts database 212, and a wallet builder 214. That is, the memory 206 includes programming, logic, etc. executable by the processor 204 to perform the processes attributed herein to the graphical user interface generator 208, the enrolled services database 210, the user accounts database 212, and the wallet builder 214.

The administration tool circuit 200 is communicably coupled to an administrator device 190. The administrator device 190 includes a computing device (e.g., desktop computer, laptop computer, tablet, mobile device) structured to display a graphical user interface to an administrator (e.g., an employee of the mobile wallet provider) and to receive input from the administrator relating to the graphical user interface.

The enrolled services database 210 is structured to receive the enrollment package from the enrollment computing system 150 and store the various programming, logic, database objects, etc. included in the enrollment package. The enrolled services database may include one or more memory devices (e.g., RAM, ROM, NVRAM, Flash Memory, hard disk storage, etc.) that store such data and programming instructions. The enrolled services database 210 thereby acquires and stores the software needed to provide the enrolled services to end users.

The user accounts database 212 is structured to store a user account for each end user of the mobile wallet computing system 130. A user account may include identifying information that identifies the user (e.g., name, identification number), contact information (e.g., phone number, email address), and/or various other biographical information. For example, the user account may store an indication of a categorization of the end user (e.g., associating the user with a department of the mobile wallet provider; indicating whether the end user is a student, staff, or faculty of a university; associating the user with a job title). User account information in the user accounts database 212 may be populated automatically from an external data source (e.g., human resources records, school enrollment records, provider institution accounts database 124), from mobile wallet database 134, and/or may be input manually by an administrator using administrator device 190. In some embodiments, addition of a new user account to an external data source may cause the administration tool circuit 200 to initiate creation of a new customized mobile wallet for the corresponding user as described herein.

Figure 7:
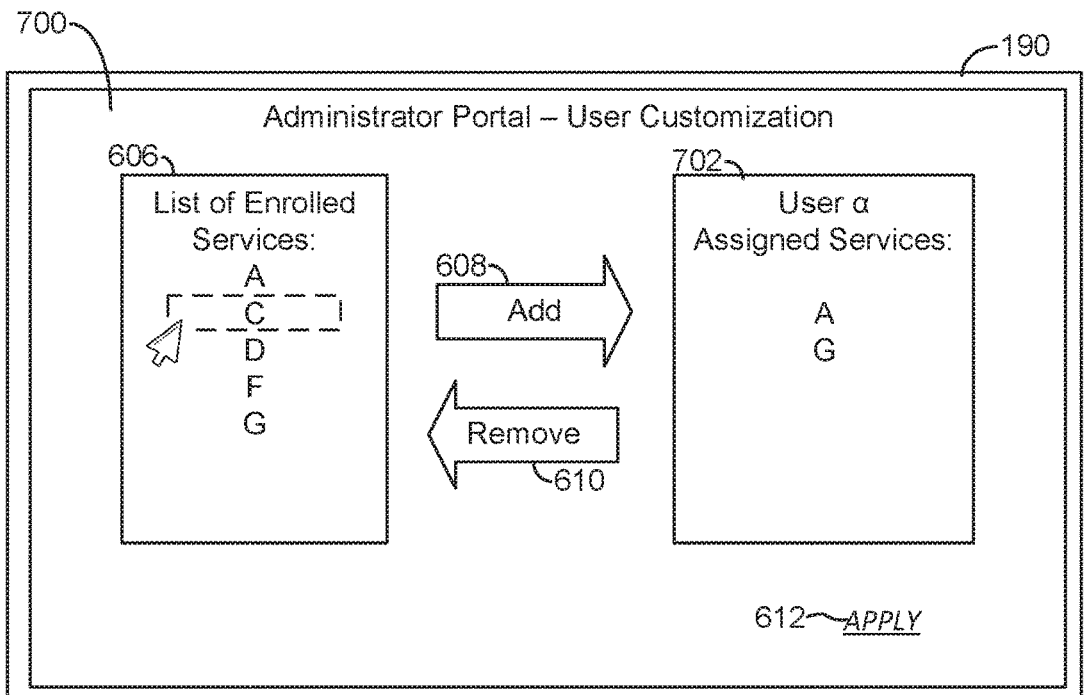
FIG. 7 is an illustration of an administrator portal interface for use with the system of FIG. 1, according to an example embodiment.

The graphical user interface generator 208 is structured to generate a graphical user interface and provide the graphical user interface to the administrator device 190. The graphical user interface generated by the graphical user interface generator 208 allows an administrator to assign a subset of the enrolled services to an end user account. More particularly, the graphical user interface allows each end user account to be assigned a different subset of enrolled services. For example, the graphical user interface may allow an administrator to select a user account, display a list of the enrolled services, allow the administrator to select a subset of the enrolled services from the list, and receive a command to assign the selected subset to the user account. An example of such a graphical user interface is shown in FIG. 7 and described in detail with reference thereto.

In some embodiments, the graphical user interface generator 208 uses the user account information from the user account database 212 to automatically generate a suggested or recommend list of services to assign to a particular user account. For example, if the end user is a student with an address indicating that the student lives in a dorm building, the graphical user interface generator 208 may provide a recommendation that the administrator assign the student a building access service that allows access to the dorm building and a meal plan service that facilitates payment for meals at a dining hall at the dorm building. Many such examples are within the scope of the present disclosure.

In some cases, the graphical user interface generator 208 is structured to cause the graphical user interface to prompt the administrator for further information relating to assignment of a function to a user to facilitate provision of that service to the user. For example, if the function is a building access service (for example as described in detail with reference to FIG. 10), the graphical user interface may prompt the administrator to select a list of buildings, spaces, categories of spaces, doors, areas, etc. that the user will be able to access using the building access service of a mobile wallet. In some embodiments, the graphical user interface includes information relating to the user's status or role to facilitate an administrator in selecting a list of areas that the user will be able to access.

In some embodiments, the graphical user interface may provide a recommended list of areas, locations, or regions that the user should have access to, for example based on the user's status (e.g., as a student with a particular major, an employee with a given job title, etc.) or other user account information. For example, if the user account information indicates that the end user has a job in a particular building on a campus, the graphical user interface may provide a recommendation that the administrator select that building for the user to be able to access using the mobile wallet.

As another example, if the service is a payroll service that allows a user to receive a paycheck at the mobile wallet, the graphical user interface may prompt the administrator to input a payroll identification number, account number, or other information useful in associating the user account with the correct paycheck in a payroll system (e.g., a third party computing system 140). This may also be used to facilitate various other third-party services. That is, the graphical user interface may facilitate an administrator in associating a user account of the mobile wallet computing system 130 with appropriate accounts in the third party accounts database 146 and/or the provider institution accounts database 124. The graphical user interface generator 208 thereby facilitates an administrator in configuring a customized mobile wallet for a particular user by selecting a subset of the enrolled services that will be accessible to the particular user (hereinafter the "assigned services").

The wallet builder 214 is structured to access the user accounts in the user accounts database 212 and build a customized mobile wallet for each user account based on the assigned services associated with that account (e.g., selected for that user via the graphical user interface). For example, for each user account, the wallet builder 214 may create a mobile wallet interface that provides access to the assigned services and prevents access to the remainder of the enrolled services (e.g., the services that were not assigned to that user account). The wallet builder 214 may also aggregate any programming, logic, database objects, code, etc. from the enrollment package that facilitates execution of the assigned services. In some cases, the wallet builder 214 generates an authorization program executable to control which of the various enrolled services are available to a particular user computing device 110, i.e., that allows a user to access services assigned to a user account for that service and prevents the user from accessing services not assigned to the user account for that service. Such an authorization program may include instructions facilitating and/or preventing various interactions between the user computing device 110 and third party computing system 140 and/or provider institution computing system 120. The wallet builder 214 thereby builds a customized mobile wallet for each user account. The wallet builder 214 may provide the customized mobile wallets to the mobile wallet database 134. In some embodiments, the mobile wallet database 134 includes a separate instance of any programming, logic, etc. for each mobile wallet (i.e., for each end user). In other embodiments, a single instance of programming, logic, etc. for each service may be included in the mobile wallet database 1304 and executed to provide the service via multiple mobile wallets (i.e., for multiple end users). In any case, the mobile wallet database 134 and the mobile wallet circuit 136 ensure that an end user of a user computing device 110 has access to the services assigned to that end user.

The mobile wallet circuit 136, the mobile wallet database 134, and the mobile wallet network circuit are structured to provide access to the customized mobile wallets and the assigned services therein to users of user devices 106, for example as described above with reference to FIG. 1 The mobile wallet computing system 130 may be configured to receive a request from a user computing device 110 to access a customized mobile wallet for a particular user and associated that particular user with a particular user account. Various security and authorization services may be used, for example based on a username and password associated with the user and/or biometric information of the user stored at the mobile wallet database 134, account information and security authorizations sourced from the provider institution computing system 120 and/or the third party computing system 140, or some other approach. The mobile wallet computing system 130 may then identify the customized mobile wallet corresponding to the correct user account, and provide access to that customized mobile wallet via the user computing device 110.

Figure 8:
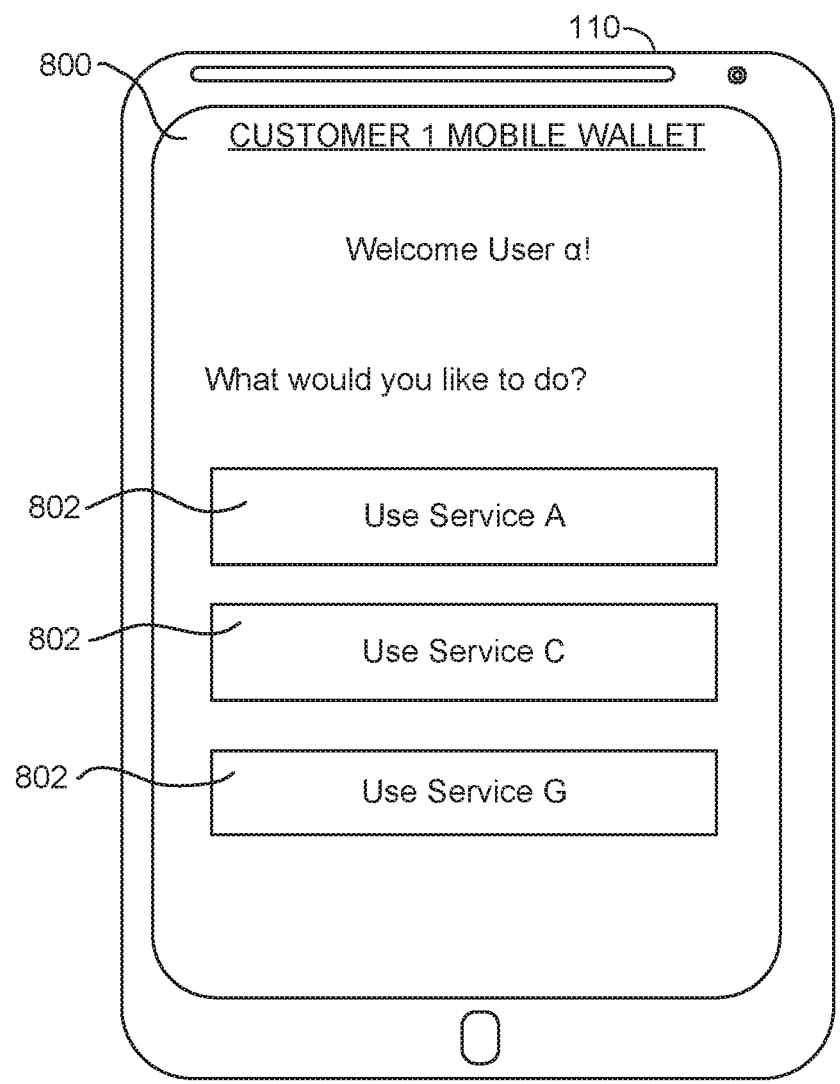
FIG. 8 is an illustration of a customized mobile wallet interface for use with the system of FIG. 1, according to an example embodiment.

The mobile wallet circuit 136 may then provide the user computing device 110 with a graphical user interface that provides the end user with selectable options to access the assigned services for that end user. An example of such a graphical user interface is shown in FIG. 8 and described in detail with reference thereto. The graphical user interface may provide a list of the assigned services that does not include any services not assigned to that end user by an administrator.

The mobile wallet circuit 136 may then receive a request from the end user via the graphical user interface on the user computing device 110 (i.e., via the user input/output device 116) to provide one of the assigned services. In response, the mobile wallet circuit 136 may cause various programming, logic, etc. to be executed to provide the selected service. In some cases, the mobile wallet circuit may use an application programming interface to interact with a third party computing system 140 and/or the provider institution computing system 120 to provide the selected service.

For example, the assigned services may include an access control service. In such a case, the end user may input a request to the user computing device 110 to unlock a door proximate to the user. The mobile wallet computing system 130 may receive the request and check authorization information for the end user to determine whether the end user is authorized to access the door (i.e., to access a space accessible via the door) as stored in the mobile wallet database 134 and/or as stored at a third party accounts database 146. If the mobile wallet computing system 130 determines that the end user is authorized to access the door, the mobile wallet computing system 130 may send a request to a building security system (i.e., a third party computing system 140) to unlock the door. The third party computing system 140 may remotely control a locking mechanism to unlock the door for a brief period of time in response to the request from the mobile wallet computing system 130. The end user may then pass through the door.

As another example, the assigned services may include a mobile wallet paycheck service. The mobile wallet paycheck service may allow a user to receive a paycheck at the mobile wallet and make purchases using the value of the paycheck. For example, the mobile wallet computing system 130 may interact with the provider institution computing system 120 to create a debit account directly associated with the mobile wallet at the provider institution accounts database. Funds from a paycheck for the user may then be deposited in the debit account associated with the user's mobile wallet. In such a case, the end user may input a request to the user computing device 110 to view or edit information relating to the mobile wallet paycheck service, such as an account balance, a paycheck history, a paycheck schedule, etc. The mobile wallet computing system 130 may authorize the user computing device to interact with the provider institution computing system 120 to manage various aspects of the mobile wallet paycheck service. The end user may also request to make a payment using funds from a paycheck via the mobile wallet paycheck service. For example, in some cases the end user may select the mobile paycheck service on the graphical user interface of the user computing device 110 and position the user computing device 110 proximate a vendor's point-of-sale system, for example to execute a transaction using NFC and/or under a secure element framework, host card emulation framework, or TEE as described above. The point-of-sale system, the provider institution computing system 120, the user computing device 110, and the mobile wallet computing system 130 may interact to facilitate an electronic transfer of funds from the end user's mobile wallet to an account associated with the vendor as described above.

As another example, the assigned services may include a food voucher service, for example associated with a meal program at a university, business park, or other campus setting. The mobile wallet computing system 130 may facilitate interactivity between a food vendor system (i.e., a third party computing system 140) and the user computing device 110 to facilitate tracking of the end user's consumption of food or other products and/or payment or other reimbursement relating to that consumption.

As another example, the assigned services may include a gym membership service. In such a case, the mobile wallet computing system 130 may generate a graphical user interface that allows a user to reserve and/or pay for a place in a fitness class. The mobile wallet computing system 130 may also provide a service that allows the user computing device 110 to be used to gain access to a gym facility, for example by generating a graphical user interface that includes a barcode that may be scanned by a third party system 112 at an entrance to the gym facility and/or by controlling the user computing device 110 to communicate with a point-of-access system at the gym facility using NFC.

As another example, the assigned services may include an expense reimbursement system. In such a case, the mobile wallet computing system 130 may be structured to facilitate the user computing device 110 in allowing a user to capture an image of a receipt and/or input other information relating to an expense. The mobile wallet computing system 130 may then facilitate communication with an expense reimbursement system (i.e., a third party system 140) to provide the request for reimbursement to the expense reimbursement system and cause the reimbursed funds to be transferred from the expense reimbursement system to an account associated with the user at the provider institution computing system 120. The reimbursed funds may then be used to make purchases using the customized mobile wallet.

Various other assigned services may be included in other embodiments, for example a debit card and/or credit card service that allows a user to make a purchase using an account associated with a debit card or credit card, a bursar account service that facilitates an end user in making tuition payments, a library service that facilitates an end user in checking out a book or other media from a library, a room reservation service that facilitates an end user in making a reservation for a meeting room, classroom, other space, and a class registration service that facilitates an end user in registering for classes, among many other possibilities.

It should be understood that of the various possible enrolled services, different subsets may be useful for different end users. For example, a university may provide the mobile wallet computing system 130 for end users that include students and faculty. Students may be assigned mobile wallet services such as the access control service, the food voucher service, and a gym membership service. Faculty may be assigned the access control service, the mobile wallet paycheck service, and the expense reimbursement service. In this example, the mobile wallet computing system 130 thereby provides students with services useful for students and faculty services useful for faculty within a unified system, while allowing for flexibility and overlap. For example, a student with an on-campus job working for the university may be assigned the mobile wallet paycheck service using the administration tool circuit 200 and the administrator device 190. The mobile wallet computing system 130 is therefore highly customizable and tailorable to meet the needs of individual end users.

Furthermore, it should be understood that the framework described herein is highly configurable. For example, some services/services may be provided be provided primarily by the mobile wallet computing system 130, while other services/services may be provided by allowing the user computing device 110 to communicate and interact with the third party computing systems 140 and/or provider institution computing system 120 via the mobile wallet computing system 130. Other services may be provided by allowing the authorizing the user computing device 110 and/or providing the programming necessary to facilitate the user computing device 110 to interact directly with the third party computing systems 140 and/or provider institution computing system 120 via the network 150. Other services may be provided by programming the user computing device 110 to execute various functions locally at the user computing device 110. The administrated, customized mobile wallet framework described herein is therefore highly flexible.

Figure 3:
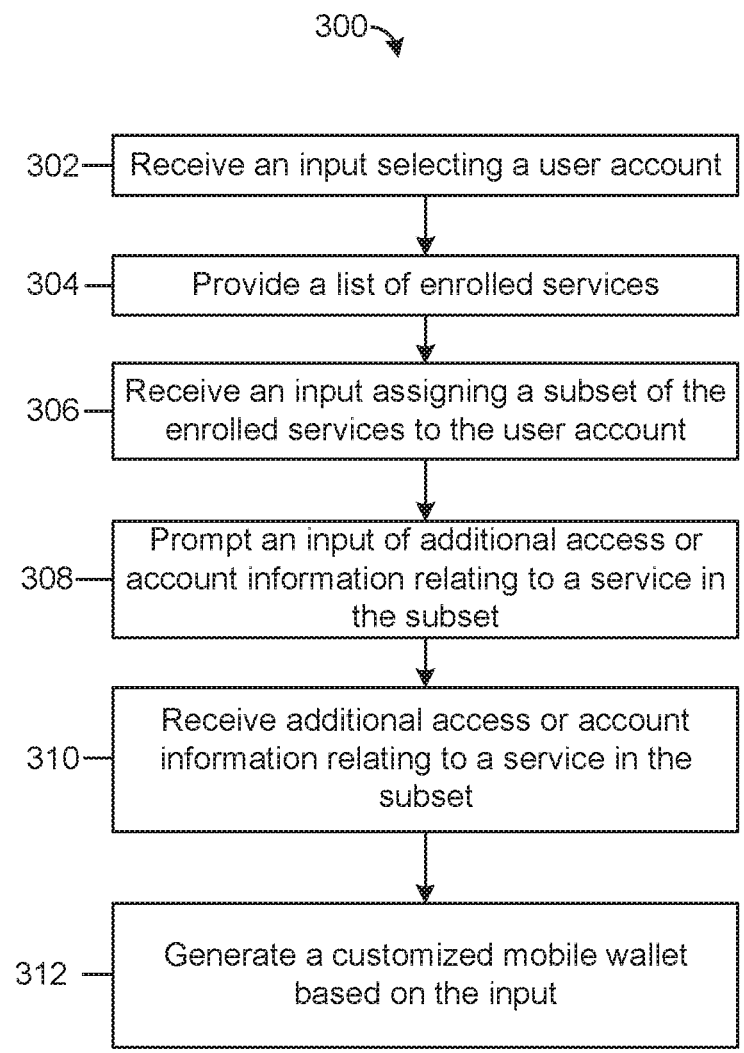
FIG. 3 is a flowchart of a process for administrating customized mobile wallets, according to an example embodiment.

Referring now to FIG. 3, a flowchart of a process 300 for customizing a mobile wallet is shown, according to an example embodiment. The process 300 may be carried out by the administration tool circuit 200 of the mobile wallet computing system 130 in communication with the administrator device 190.

At step 302, an input selecting a user account is received. For example, the administration tool circuit 200 receives a user input from the administrator device 190 selecting a user account. In some cases, the administration tool circuit 200 may provide a search service via the administrator device 190 that allows an administrator to search for and selecting a user account. The user account corresponds to a particular end user for whom a customized mobile wallet is to be customized following process 300.

At step 304, a list of enrolled services is provided. For example, the administration tool circuit 200 provides a list of enrolled services to the administrator device 190. The list of enrolled services includes the enrolled services available to be assigned to a user account and included in the customized mobile wallet for the end user. The list may be provided on a graphical user interface, for example as shown in FIG. 7 and described in detail with reference thereto below. The graphical user interface may also include a list of assigned services already assigned to the user account.

At step 306, an input is received that requests assignment of a subset of the enrolled services to the user account. For example, the administration tool circuit 200 receives a user input via the administrator device 190 assigning a subset of the enrolled services to the user account. In response to receiving the input assigning the subset of the enrolled services (the "assigned services"), at step 308 a graphical user interface is generated and provided to an administrator that includes one or more prompts for additional access or account information relating to one or more of the assigned services. For example, if an access control service is selected, the administration tool circuit 200 may generate a graphical user interface prompting an administrator to select, via the administrator device 190, one or more doors, spaces, areas, buildings, etc. that the user shall be able to access using the access control service.

At step 310, additional access or account information relating to a service in the selected subset of services is received. For example, the administration tool circuit 200 receives the additional access or account information prompted from the administrator by the graphical user interface generated at step 308. The input information and a list of the assigned services may be stored at the user account.

At step 312, a customized mobile wallet is generated based on the received input. (i.e., based on the updated user account). For example, the administration tool circuit 200 generates a customized mobile wallet based on the input from received from an administrator via the administrator device 190. The customized mobile wallet is associated with an end user associated with the user account selected at step 302. The customized mobile wallet includes programming, logic, graphical elements, etc. useful for providing the assigned services to the end user via the user computing device 110. In some embodiments, the mobile wallet computing system causes account information stored at the third party accounts database 146 to be added and/or modified to facilitate implementation of the customized mobile wallet.

The process 300 may be repeated for each of multiple user accounts stored by the administration tool circuit 200 (e.g., for each of multiple end users). The process 300 thereby allows an administrator to assign which services shall be made available to each of multiple end users and provides for customization of mobile wallets in accordance with the administrator's input.

Figure 4:
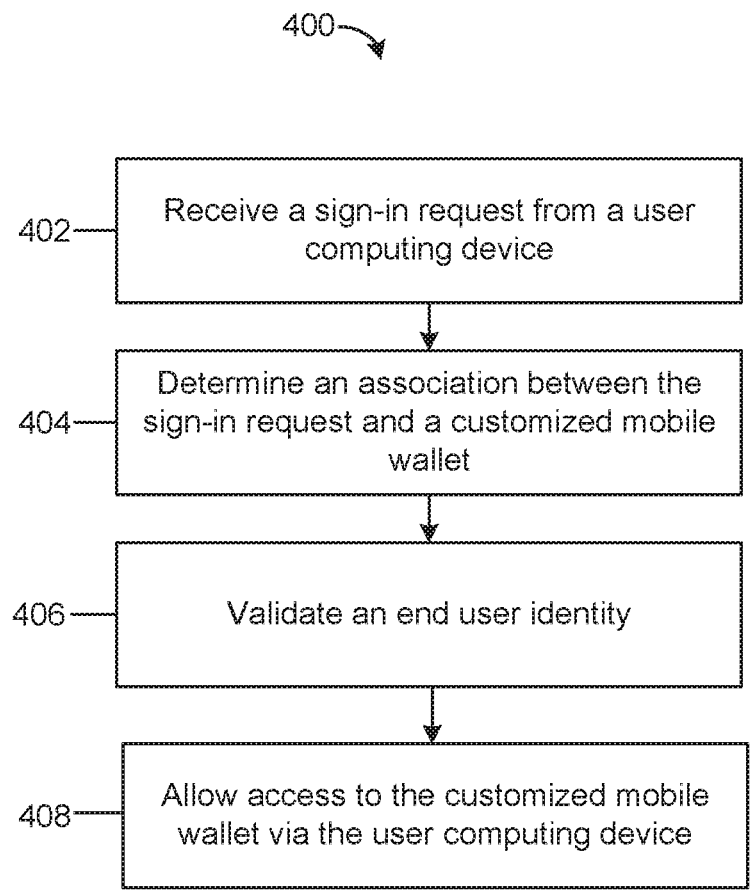
FIG. 4 is a flowchart of a process for providing access to a customized mobile wallet, according to an example embodiment.

Referring now to FIG. 4, a process 400 for controlling access to a customized mobile wallet is shown, according to an example embodiment. The process 400 may be executed by the mobile wallet circuit 136 of FIG. 2. The process 400 ensures that the correct customized mobile wallet is securely provided to the corresponding end user.

At step 402, a sign-in request is received from an end user (e.g., from a user computing device 110). For example, the mobile wallet circuit 136 receives a sign-in request from the user computing device 110. The sign-in request may include a username and/or end user device identifier (e.g., IP address, phone number), identification token, or other information that may be uniquely linked to the user. For example, the user accounts database 212 may include a unique ID number for each user account stored in the user accounts database 212, which may be populated from a student enrollment system, a human resources system, etc. The unique ID number may be associated with the customized mobile wallet for the user account by the wallet builder 214. At step 404, the mobile wallet circuit 136 determines an association between the sign-in request and a particular customized mobile wallet. For example, the mobile wallet circuit 136 may query a look-up table stored by the mobile wallet database 134 that pairs each of the customized mobile wallets with the unique ID number, username, and/or end user device identifier. The mobile wallet circuit 136 may determine that the sign-in request is associated with a particular customized mobile wallet based on a pairing in the look-up table. The mobile wallet circuit 136 thereby determines which customized mobile wallet should be made available via the particular user computing device 110.

At step 406, the end user's identity is validated. For example, the mobile wallet circuit 136 may validate the end user's identity. In some embodiments, the mobile wallet circuit 136 causes the user computing device 110 to prompt the user for a password, fingerprint scan, or other biometric scan or input. The mobile wallet circuit 136 may compare the password, fingerprint scan, etc. to a corresponding stored password, fingerprint scan and validate the end user's identify if a match is found. In some embodiments, the mobile wallet circuit 136 communicates with the provider institution computing system 120 to employ various advanced security and authorization services of the provider institution computing system 120 for facilitating validation of the user's identity. Various security protocols and procedures are possible.

At step 408, in response to validation of the end user's identity, access is allowed to the customized mobile wallet via the user computing device 110. For example, the mobile wallet circuit 136 allows access to the customized mobile wallet via the user computing device 110. That is, the mobile wallet circuit 136 allows the user computing device 110 to access, utilize, deploy, etc. the various services included in the customized mobile wallet. The wallet service 220 thereby provides the user computing device 110 with access to (i.e., with the ability to use the services of) the particular customized wallet associated with the sign-in request at step 404.

Figure 5:
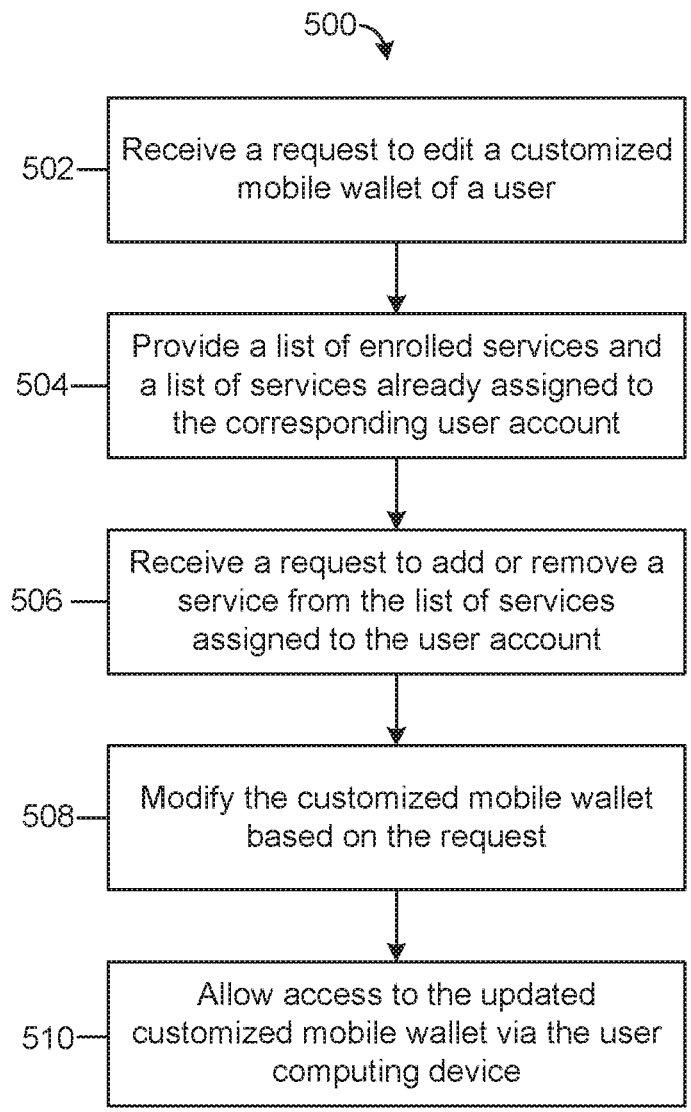
FIG. 5 is a flowchart of a process for modifying a customized mobile wallet, according to an example embodiment.

Referring now to FIG. 5, a flowchart illustrating a process 500 for modifying a customized mobile wallet is shown, according to an example embodiment. The process 500 may be executed by the administration tool circuit 200 and the wallet application circuit 202 of the mobile wallet computing system 130 of FIG. 2.

At step 502, a request to edit an end user's mobile wallet is received. For example, the administration tool circuit 200 receives a request to edit an end user's mobile wallet. The request may be input by an administrator to the administrator device 190 and transmitted from the administrator device 190 to the administration tool circuit 200. In response to receiving the request, at step 504 a list of enrolled services and a list of assigned services is provided. For example, the administration tool circuit 200 may generate a graphical user interface that includes a list of the enrolled services and a list of the services already assigned to the selected user (i.e., already available in the selected mobile wallet). The graphical user interface may be displayed by the administrator device 190. An example of such a graphical user interface is shown in FIG. 7 and described in detail with reference thereto.

In some embodiments, the request to edit an end user's mobile wallet may be triggered by a change to user account information in the user accounts database 212, third party computing system 140, or provider institution computing system 120. For example, user account information may be updated by an HR system or other system to indicate that an end user has taken a new job (e.g., a student hired to work in a laboratory on campus), has switched roles within a mobile wallet provider (e.g., promoted, switched departments), etc. This change in information may trigger an alert to an administrator (e.g., at the administrator device 190) instructing the administrator to review and/or update the assigned services for that end user. The administrator may select the alert to input the request to edit the end user's mobile wallet.

At step 504, the list of enrolled services for the mobile wallet provider and the list of assigned services for the user account may be provided, e.g., on a graphical user interface. At step 506, a request is received to add or remove one or more services from list of assigned services. For example, the administration tool circuit 200 receives a request (e.g., input by a user via the administrator device 190) to add or remove services from the list of assigned services for the selected user account. For example, an administrator may select an undesired service on the list of assigned services and then select a "remove" button to request to remove the undesired service from the list of assigned services. The administration tool circuit 200 may update the user account accordingly. Also at step 506, various lower-level settings and information relating to the assigned features may be modified by an administrator, for example to edit the buildings/doors/areas/etc. that may be accessed by a particular end user with the customized mobile wallet.

At step 508, the customized mobile wallet corresponding is modified based on the request to add or remove services. For example, the administration tool circuit 200 modifies the corresponding mobile wallet based on the request (e.g., based on the updated user account). The administration tool circuit 200 may add a service to the mobile wallet, for example by providing additional programming, logic, code, etc. to the wallet service 200 executable to provide the added service. The administration tool circuit 200 may also remove a service from a mobile wallet, for example by modifying the programming, logic, code, etc. at the mobile wallet database 134 to prevent the end user corresponding to the modified mobile wallet from accessing the removed service. At step 510, access is allowed to the updated customized mobile wallet via a user computing device 110. For example, the wallet application circuit 202 provides access to the updated customized mobile wallet to the corresponding end user via the user computing device 110.

Referring now to FIG. 6, a provider portal interface 600 displayed on the enrollment portal device 152 is shown, according to an example embodiment. The provider portal interface 600 is structured to allow a user (e.g., an employee of the provider entity) to modify the list of enrolled services for a mobile wallet provider, for example to tailor the complexity of the mobile wallet computing system 130 to meet the needs of the mobile wallet provider. As shown in FIG. 6, the provider portal interface 600 includes a list of available services 604 and a list of enrolled services 606 for a particular mobile wallet provider. The list of available services 604 lists all of the mobile wallet services support by and/or otherwise available from the enrollment computing system 150. A user of the provider portal interface 600 may select an entry from the list of available services, for example Service C as illustrated in FIG. 6. The user may then select the add button 608 to cause the selected service (i.e., Service C) to be added to the list of enrolled services 606. A user of the provider portal interface 600 may also select an entry from the list of enrolled services 606 and then select the remove button 610 to remove the selected service from the list of enrolled services.

As shown in FIG. 6, the provider portal interface 600 includes an apply button 612. The apply button 612 is selectable by a user to cause the enrollment computing system 150 to save changes to the list of enrolled services 606 and update the mobile wallet computing system 130 accordingly. For example, in response to user input requesting addition of a selected service to the enrolled services, the enrollment computing system 150 may then provide programming, logic, database objects, etc. relating to the selected service to the mobile wallet computing system 130. As another example, in response to user inputs requesting removal of a selected service from the enrolled services, the enrollment computing system 150 may cause the mobile wallet computing system 130 to delete or otherwise disable the programming, logic, etc. associated with the selected service.

Referring now to FIG. 7, an administrator portal interface 700 displayed on the administrator device 190 is shown, according to an example embodiment. The administrator portal interface 700 is structured to allow an administrator to select which services will be made available to a selected end user. As shown in FIG. 7, the administrator portal interface 700 includes the list of enrolled services 606 that lists the services enrolled in by the mobile wallet provider (e.g., selected for the mobile wallet provider using the provider portal interface 600). The administrator portal interface 700 also includes an assigned services list 702 showing the services already assigned to the selected user (shown as "User a"). To assign a service to the selected user's account (i.e., to make the service available in a customized mobile wallet for the selected user), an administrator may select (e.g., click on) a service from the list of enrolled services 606 (e.g., Service C as shown in FIG. 7) and select the add button 608. To remove a service from the list of assigned services 702, the user may select an entry from the list of assigned services and select the remove button 610. The apply button 612 is selectable to save and apply any changes to the list of assigned services 702. That is, in response to a user selection of the apply button 612, the administration tool circuit 200 may create or modify a customized mobile wallet for the selected user to provide the customized mobile wallet with the services shown on the assigned services list 702 on the administration portal interface 700.

Referring now to FIG. 8, a customized mobile wallet interface 800 is shown as displayed on a user computing device 110, according to an example embodiment. The customized mobile wallet interface 800 allows an end user to access the assigned services for that end user. In the example of FIG. 8, the customized mobile wallet interface 800 includes service buttons 802 for each of the three assigned services. A service button 802 is selectable by the user to access the corresponding assigned service.

Figure 9:
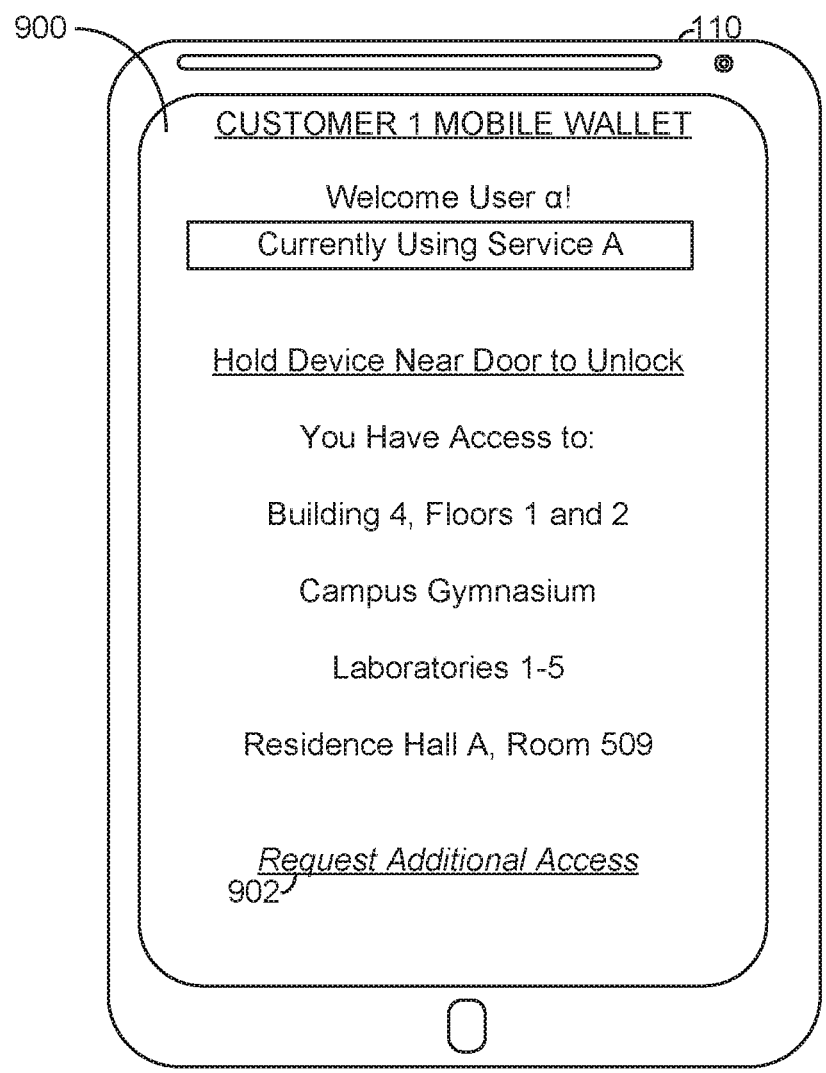
FIG. 9 is an illustration of a service interface for use with the system of FIG. 1, according to an example embodiment.

Referring now to FIG. 9, an access control interface 900 displayed on the user computing device 110 is shown, according to an example embodiment. The access control interface 900 may be displayed in response to a user selection of a corresponding service button 802 on the customized mobile wallet interface 800. The access control interface 900 includes directions on how to use the access control service of the mobile wallet computing system 130 (e.g., shown as "Hold Device Near Door to Unlock") as well as a list of spaces that may be accessed using the access control service. The access control interface 900 also includes a request additional access button 902 that may allow a user to send a message to an administrator requesting access to an additional space using the access control service.

Figure 10:
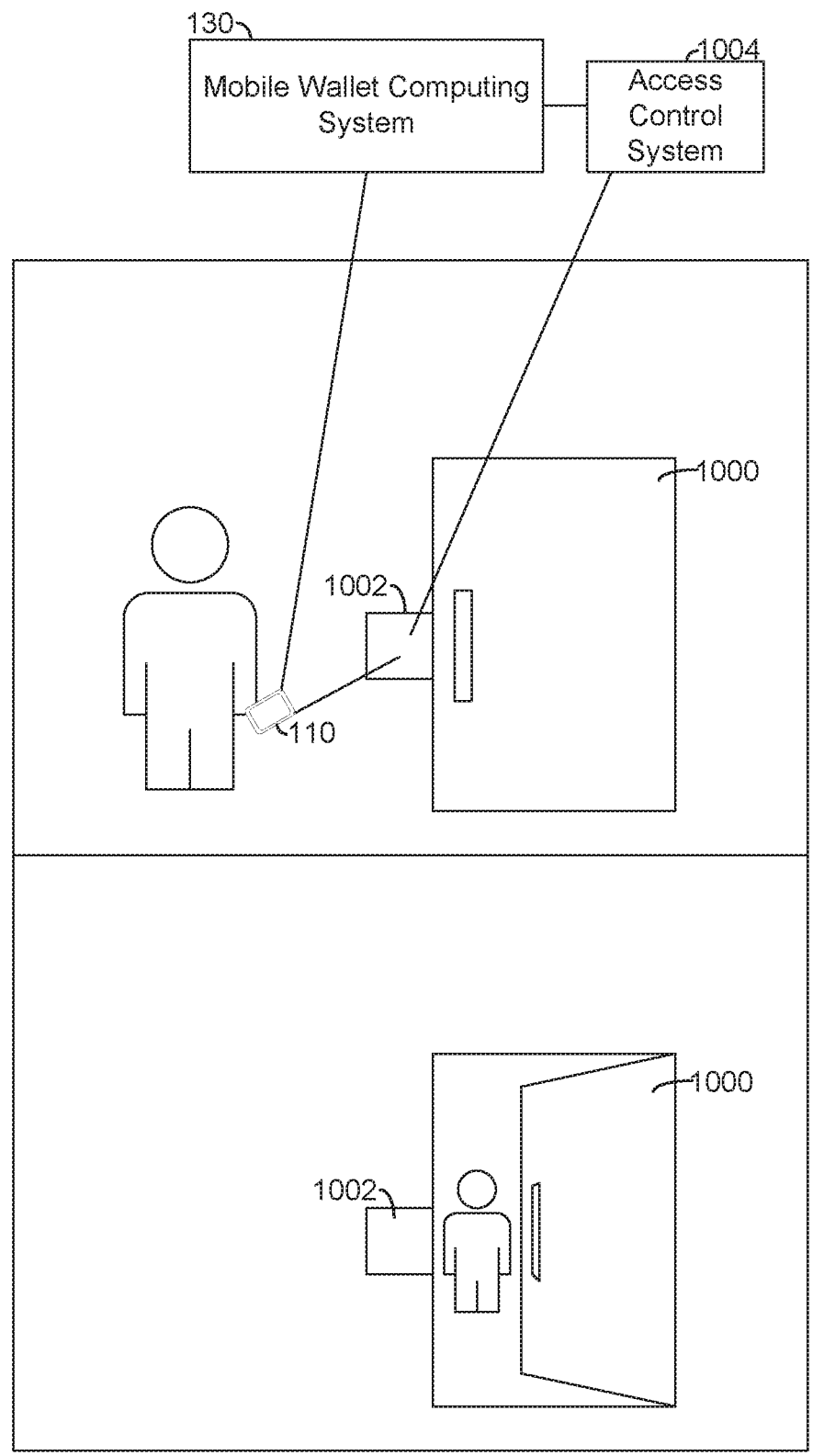
FIG. 10 is a depiction of an access control service of the mobile wallet computing system of FIG. 1, according to an example embodiment.

Referring now to FIG. 10, an illustration of an end user using the access control service of the mobile wallet computing system 130 is shown, according to an example embodiment. As directed by the access control interface 900, FIG. 9 shows an end user holding the user computing device 110 near a door 1000 and a locking mechanism 1002. The user computing device 110 may communicate with the locking mechanism 1002 (e.g., via NFC) and/or the mobile wallet computing system 130. For example, the user computing device 110 may receive a verification from the locking mechanism 1002 that the user computing device 110 is in proximity to the locking mechanism 1002 and forward the verification to the mobile wallet computing system 130. The mobile wallet computing system 130 may check access settings (e.g., stored in the mobile wallet database 134) to determine whether the administrator has assigned the user with access to that particular door 1000. If the administrator has assigned the user with access to the door 100, the mobile wallet computing system 130 may interact with the access control system 1004 (i.e., a third party system 112) to control the locking mechanism 1002 to unlock the door 1000 (i.e., to allow the door 1000 to be opened). The end user may then pass through the door 1000 as illustrated in FIG. 9. The locking mechanism 1002 may re-lock the door 1000 (i.e., to prevent the door 100 from being opened) after a threshold duration of time. FIG. 9 thus illustrates one of the many services available in the customized mobile wallets of the present disclosure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
   an administration tool circuit structured to:
      store a list of enrolled services for a mobile wallet application, the enrolled services selected from a set comprising an access control service, a food voucher service, a bursar account service, a gym membership service, a library service, a room reservation service, and a class registration service;
      store a plurality of user accounts corresponding to a plurality of end users of the mobile wallet application, wherein the end users are occupants of a campus and have different roles on the campus, the roles comprising students, faculty, and staff;
      provide a portal structured as a graphical user interface that allows an administrator for the campus to input commands to selectively assign different subsets of the enrolled services to different user accounts of the plurality of user accounts based at least in part on the different roles of the end users;
      configure, for each of the user accounts, the subset of the enrolled services with user-specific information relating to the subset of enrolled services and a corresponding end user of the plurality of end users, the configuration including a designation of one or more doors that the corresponding end user is authorized to unlock; and generate different customized mobile wallets for the plurality of users based on the plurality of user accounts, each customized mobile wallet providing access to the subset of the enrolled services assigned to a corresponding user account and customized based on the user-specific information for the corresponding end user of the plurality of end users; and a mobile wallet circuit coupled to the administration tool circuit, the mobile wallet circuit structured to:
receive the plurality of customized mobile wallets from the administration tool circuit;
associate a first user device corresponding to a first end user with a first customized mobile wallet;
receive a request from the first user device to access the access control service provided via the first customized mobile wallet, wherein the request to access the access control service comprises a request to unlock a particular door;
validate an identity of the first end user; and
provide the access control service via the first user device and via the first customized mobile wallet by:
determining that the first end user is permitted to access the particular door based on the configuration of the access control service generated by the administration tool circuit based on the user-specific information; and
based on the determination that the first end user is permitted to access the particular door, control a locking mechanism to unlock the particular door.

2. The system of claim 1, further comprising an enrollment computing system coupled to the administration tool circuit and structured to:
store a repository of services comprising the enrolled services and one or more un-selected services;
receive an input requesting that a second service of the un-selected services be made available to a customer;
provide the second service to the mobile wallet circuit; and
cause the second service to be added to the list of enrolled services.

3. The system of claim 1, wherein the administration tool circuit is structured to configure the access control service based on a role of the first end user selected from the different roles on the campus, wherein the first end user is provided with authority to access a first set of doors when the first end user is a student and to access a second set of doors when the first end user is included in the faculty.

4. The system of claim 1, wherein the mobile wallet service is further configured to provide a mobile wallet paycheck service, the mobile wallet paycheck service allowing the first end user to receive a paycheck at the first customized mobile wallet.

5. The system of claim 1, wherein the set further comprises a mobile wallet paycheck service, an expense reimbursement service, and a credit or debit card service.

6. The system of claim 1, wherein:
the mobile wallet circuit is coupled to a third party system;
the mobile wallet circuit comprises an application program interface structured to facilitate interactivity between the wallet application circuit and the third party system;
the mobile wallet circuit is structured to provide a first service of the enrolled services by interacting with the third party system.

7. A method comprising:
storing a list of available services for a mobile wallet application;
storing a user account corresponding to a user of the mobile wallet application, wherein the user account identifies a role of the user on a campus, wherein the role is selected from a set comprising student, faculty, and staff;
automatically generating a suggested subset of services of the list of available services to assign to the user based on the role of the user on the campus;
providing a portal structured as a graphical user interface that allows an administrator for the campus to input a command to assign the suggested subset or a different subset of the available services to the user account to define assigned services for the user;
configuring the assigned services with user-specific information relating to the assigned services and relating to the user, the configuration including a designation of one or more doors that the user is authorized to unlock;
generating a customized mobile wallet for the user based on the user account, the customized mobile wallet providing access to the assigned services and preventing access to non-assigned services of the list of available services;
receiving a request from a user device to access a first service of the customized mobile wallet, wherein the first service is the access control service and the request comprises a request to unlock a particular door; and
providing the first service at the user device via the customized mobile wallet by:
determining that the user is permitted to access the particular door based on the configuration of the access control service for the user indicated in the customized mobile wallet for the user; and
based on the determination that the user is permitted to access the particular door, controlling a locking mechanism to unlock the particular door.

8. The method of claim 7, comprising:
storing a repository of services comprising the available services and one or more un-selected services;
receiving input requesting that a second service of the un-selected services be made available to a customer associated with the campus;
causing the second service to be added to the list of available services.

9. The method of claim 7, further comprising providing, via the customized mobile wallet, a mobile wallet paycheck service, the mobile wallet paycheck service allowing a user to receive a paycheck at the mobile wallet.

10. The method of claim 7, wherein the list of available services comprises two or more of an access control service, a food voucher service, a bursar account service, an expense reimbursement service, a gym membership service, a library service, a room reservation service, or a class registration service.

11. The method of claim 7, further comprising providing a first service of the available services by interacting with a third party system via an application programming interface.

12. A non-transitory computer-readable media containing program instructions that, when executed by one or more processors, cause the one or more processors to perform operations comprising:
storing a list of available services for a mobile wallet application;
storing a user account corresponding to a user of the mobile wallet application, wherein the user account identifies a role of the user on a campus, wherein the role is selected from a plurality of roles comprising student, faculty, and staff;

automatically generating a suggested subset of the list of available services to assign to the user based on the role of the user on the campus;

providing a portal structured as a graphical user interface that allows an administrator to input a command to assign the suggested subset or a different subset of the available services to the user account to define assigned services for the user;

configuring the assigned services with user-specific information relating to the subset of enrolled services, the configuration including a designation of one or more doors that the user is authorized to unlock;

generating a customized mobile wallet for the user based on the user account, the customized mobile wallet providing access to the assigned services and not providing access to unassigned services of the list of available services;

receiving a request from a user device to access the access control service provided via the customized mobile wallet, wherein the request to access the access control service comprises a request to unlock a particular door; and providing the access control service via the user device and via the customized mobile wallet by:

determining that the user is permitted to access the particular door based on the configuration of the access control service for the user indicated in the customized mobile wallet for the user; and based on determining that the user is permitted to access the particular door, automatically controlling a locking mechanism to unlock the particular door.

13. The non-transitory computer-readable media of claim 12, the operations further comprising:

storing a repository of services comprising the available services and one or more un-selected services;

receiving input requesting that a second service of the un-selected services be made available to a customer;

causing the second service to be added to the list of available services.

14. The non-transitory computer-readable media of claim 12, wherein the list of available services comprises two or more of an access control service, a meal plan service, a bursar account service, a gym membership service, a library service, a room reservation service, or a class registration service.

15. The non-transitory computer-readable media of claim 12, the operations comprising providing a first service of the assigned services by interacting with a third party system via an application programming interface.

* * * * *